United States Patent
Randall et al.

(10) Patent No.: US 8,922,548 B2
(45) Date of Patent: Dec. 30, 2014

(54) SYSTEM AND METHOD OF POINTILLIST PAINTING DESIGN

(75) Inventors: John Neal Randall, Richardson, TX (US); Kenneth W. Page, Dallas, TX (US)

(73) Assignee: SSO Venture Partners, LLC, Dallas, TX (US)

( * ) Notice: Subject to any disclaimer, the term of this patent is extended or adjusted under 35 U.S.C. 154(b) by 270 days.

(21) Appl. No.: 13/354,974

(22) Filed: Jan. 20, 2012

(65) Prior Publication Data

US 2013/0187902 A1 Jul. 25, 2013

(51) Int. Cl.
*G06T 15/00* (2011.01)

(52) U.S. Cl.
USPC ............................................. 345/419; 345/582

(58) Field of Classification Search
CPC .............. B44F 11/02; B44F 7/00; B44F 1/10
USPC ................................................. 345/419, 582
See application file for complete search history.

(56) References Cited

U.S. PATENT DOCUMENTS

| | | | |
|---|---|---|---|
| 6,011,536 A | 1/2000 | Hertzmann | |
| 6,619,860 B1 | 9/2003 | Simon | |
| 6,813,378 B2 | 11/2004 | Randall | |
| 7,044,665 B2 | 5/2006 | Cannell | |
| 7,094,292 B2 | 8/2006 | Randall | |
| 2002/0000973 A1 | 1/2002 | Randall et al. | |
| 2002/0005868 A1 | 1/2002 | Randall et al. | |
| 2003/0035917 A1 | 2/2003 | Hyman | |
| 2004/0207705 A1 | 10/2004 | Ozawa | |
| 2005/0001854 A1 | 1/2005 | Schuster | |
| 2008/0252671 A1 | 10/2008 | Cannell | |
| 2009/0033673 A1 | 2/2009 | Siegel | |
| 2012/0057919 A1 | 3/2012 | Lapstun | |
| 2012/0213966 A1 | 8/2012 | Makau | |

OTHER PUBLICATIONS

PCT International Search Report and Written Opinion for International Application No. PCT/US13/21750 dated Mar. 28, 2013.
Pindar Van Arman, Robot Artist—YouTube; http://www.youtube.com/watch?v=wnHy5MWHOpM&NR=1 (Dec. 9, 2009).
ABC News, Vangobot Painting Robot Paints Art—YouTube, http://www.youtube.com/watch?v=q74dRDH3PPU&feature=related (Nov. 9, 2010) (Video Taken Down).
ABC News, 'Vangobot' Blends Art With Technology / Video—ABC News, http://abcnews.go.com/Technology/video/vangobot-blends-art-technology-12098625 (Nov. 9, 2010).

(Continued)

*Primary Examiner* — Maurice L McDowell, Jr.
(74) *Attorney, Agent, or Firm* — Andrews Kurth LLP

(57) ABSTRACT

A method of generating a textured pointillist painting design comprises receiving a digital image file including a specification of a plurality of pixels representative of a digital image, the pixels each including a color definition, creating an ordered list of color definitions of the plurality of pixels in the digital image file, for each color definition in the ordered list determining a set of design parameters including: a dot size, a dot shape, a dot exclusion zone size, and a dot distribution scheme, for each color definition, determining a placement of a plurality of dots according to the pixels and color definitions in the digital image file and the set of design parameters, generating a dot list specifying the placement and design parameters of the plurality of dots representative of the digital image, and rendering on a display a facsimile image in response to the dot list.

22 Claims, 16 Drawing Sheets

(56) References Cited

OTHER PUBLICATIONS

A. L. Productions, Paul Kirby, Dulcinea, "The Fusion of Art and Science", About A. L. Productions, Inc., http://www.alproductions.org/about.htm (2010).

A. L. Productions, Paul Kirby, Dulcinea, "The Fusion of Art and Science", Robot, http://www.alproductions.org/dulcinea.htm (2010).

Pindar Van Arman, Robot Art—Paintings by Pindar Van Arman's Artificially Intelligent Machines, http://www.vanarman.com/index.php?section=reg (Website Down).

Pindar Van Arman, Art Robot—Pindar Van Arman's Painting Robot Zanelle—YouTube, http://www.youtube.com/watch?v=AHib2j0KX-s (Oct. 14, 2007).

Pindar Van Arman, Pindar Van Arman—YouTube, https://www.youtube.com/user/pvanarman (Date Unavailable).

Vangobot, The Vangobot Project, 2012 Paintings, Pop Art Gallery, Pop Art Machine Catalog, http://vangobot.com (2012).

Vangobot, Ink Wash Machine aka Sumitron pt1, 2012 Paintings, Pop Art Gallery, Pop Art Machine Catalog, http://vangobot.com/ink-wash-machine (2012).

Vangobot, Ink Wash Machine aka Sumitron pt2, 2012 Paintings, Pop Art Gallery, Pop Art Machine Catalog, http://vangobot.com/ink-wash-machine (2012).

Vangobot, Vangobot Paints Ocean Landscape: Technical Analysis, 2012 Paintings, Pop Art Gallery, Pop Art Machine Catalog, http://vangobot.com/ink-wash-machine (2012).

Vangobot, Painting Analogies; Textured Brush Strokes in Artistic Models, 2012 Paintings, Pop Art Gallery, Pop Art Machine Catalog, http://vangobot.com/ink-wash-machine (2012).

Vangobot, Vangobot Blog Posts, 2012 Paintings, Pop Art Gallery, Pop Art Machine Catalog, http://vangobot.com/ink-wash-machine (2011).

PCT International Preliminary Report on Patentability for International Application No. PCTUS2013/21747 mailed Jul. 31, 2014.

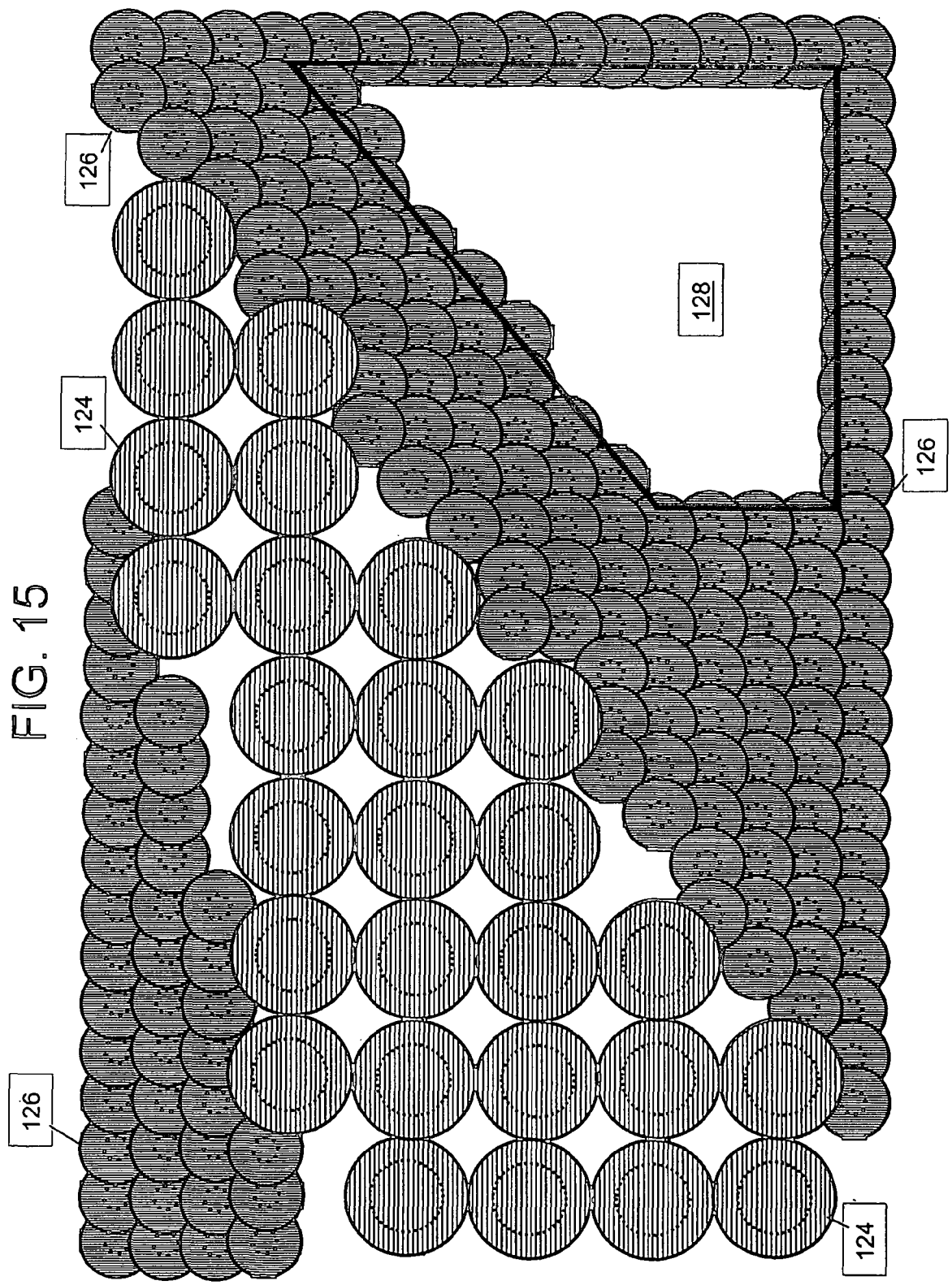

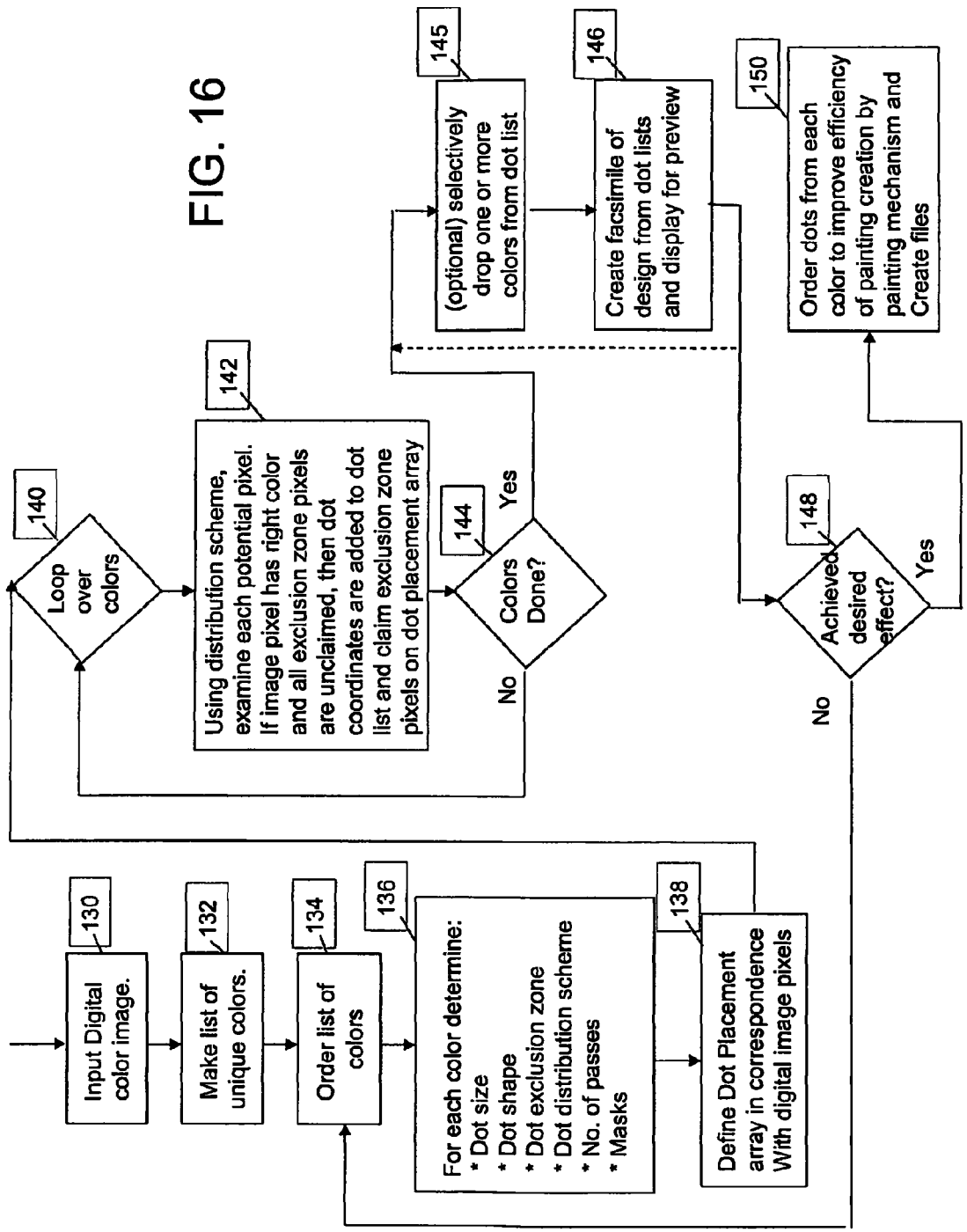

US 8,922,548 B2

SYSTEM AND METHOD OF POINTILLIST PAINTING DESIGN

FIELD

The present disclosure relates to a system and method of pointillist painting for the application of textured pigmentation to a surface.

RELATED PATENT APPLICATION AND PATENT

This patent application is related to co-pending U.S. patent application Ser. No. 13/354,934 entitled System and Method of Pointillist Painting and filed on Jan. 20, 2012. The present disclosure incorporates by reference U.S. Pat. No. 6,813,378 entitled Method for Designing Matrix Paintings and Determination of Paint Distribution issued to Randall et al. on Nov. 2, 2004 ("the '378 patent") and U.S. Pat. No. 7,094,292 entitled Mechanism for Applying Paint to Canvas issued to Randall et al. on Aug. 22, 2006 ("the '292 patent").

BACKGROUND

Pointillism is a technique of applying paint of different colors in specific patterns to form an image. The painting entitled "A Sunday Afternoon on the Island of La Grande Jatte" by George Seurat is a famous example of a pointillist painting. The artist Christian Seidler developed a pointillist painting technique called Matricism. Matricism is a technique that reduces the number of paint colors in an image by merging a distinct color design with a grayscale design. The color design has an arbitrarily small number of principle colors and the gray scale design has a limited number of values. In Matricism the number of paint colors is the product of the number of principle colors and the number of gray levels.

As referenced above, the '378 patent describes a system for designing and processing a pointillist painting using the Matricism technique, and the '292 patent describes a system for applying or depositing dots of pigmentation or paint to a surface.

SUMMARY

A method of generating a textured pointillist painting design comprises receiving a digital image file including a specification of a plurality of pixels representative of a digital image, the pixels each including a color definition, creating an ordered list of color definitions of the plurality of pixels in the digital image file, for each color definition in the ordered list determining a set of design parameters including: a dot size, a dot shape, a dot exclusion zone size, and a dot distribution scheme, for each color definition, determining a placement of a plurality of dots according to the pixels and color definitions in the digital image file and the set of design parameters, generating a dot list specifying the placement and design parameters of the plurality of dots representative of the digital image, and rendering on a display a facsimile image in response to the dot list.

A computerized system adapted to generate a textured pointillist painting design and implement the design comprises a display, a computer operable to: receive a digital image file including a specification of a plurality of pixels representative of a digital image, the pixels including a color definition, for each color definition in the digital image file, determining a set of design parameters including: a dot size, a three-dimensional dot shape, a dot exclusion zone size, and a dot distribution scheme, for each color definition, determining a placement of a plurality of dots according to the pixels and color definitions in the digital image file and the set of design parameters, generating a dot list specifying the placement and design parameters of the plurality of dots representative of the digital image, and rendering on a display a facsimile image in response to the dot list, and a colorant dispenser operable to apply a specified amount of a colorant to the painting surface and creating a plurality of dots having a two-dimensional coverage and three-dimensional profile at the specified placement on the painting surface in accordance with the dot list.

A computerized method of generating a textured pointillist painting design comprises receiving a digital image file including a specification of a plurality of pixels representative of a digital image, the pixels each including position information and color definition, for each color definition in the ordered list determining a set of design parameters for a plurality of dots, for each color definition, determining a placement of the plurality of dots according to the position information and color definitions of the plurality of pixels in the digital image file and the set of design parameters, generating a dot list specifying the placement and design parameters of the plurality of dots representative of the digital image, and rendering on a display a three-dimensional facsimile image in response to the dot list.

BRIEF DESCRIPTION OF THE DRAWINGS

FIG. 15 is an illustrative example of paint dot placement as shown in FIG. 14 with the addition of a mask in a region of paint dots of the second color; and FIG. 16 is a simplified flowchart of an exemplary method of pointillist painting design.

DETAILED DESCRIPTION

Figure 1:
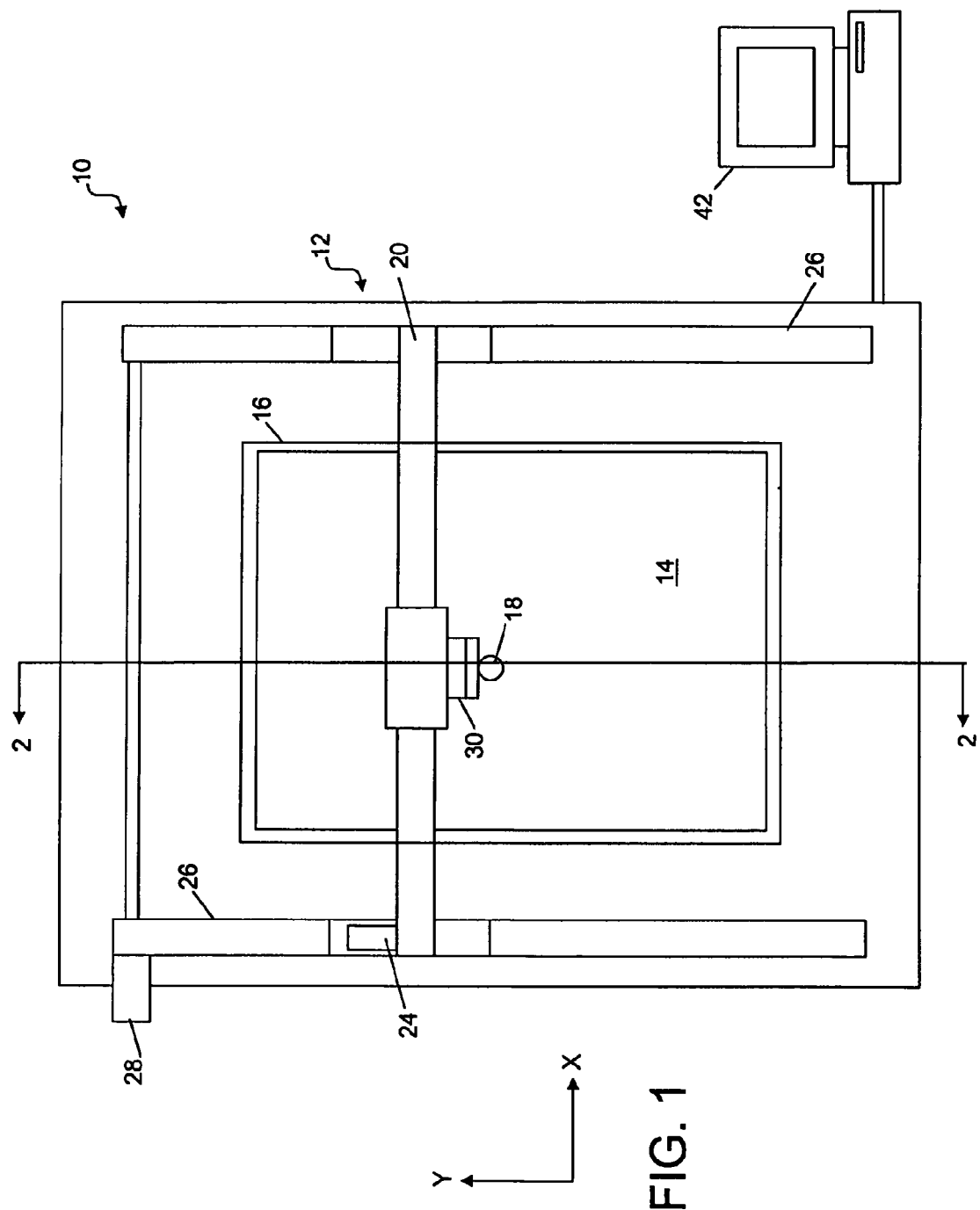
FIG. 1 is a simplified top view of an exemplary embodiment of a system of pointillist painting.
Figure 2:
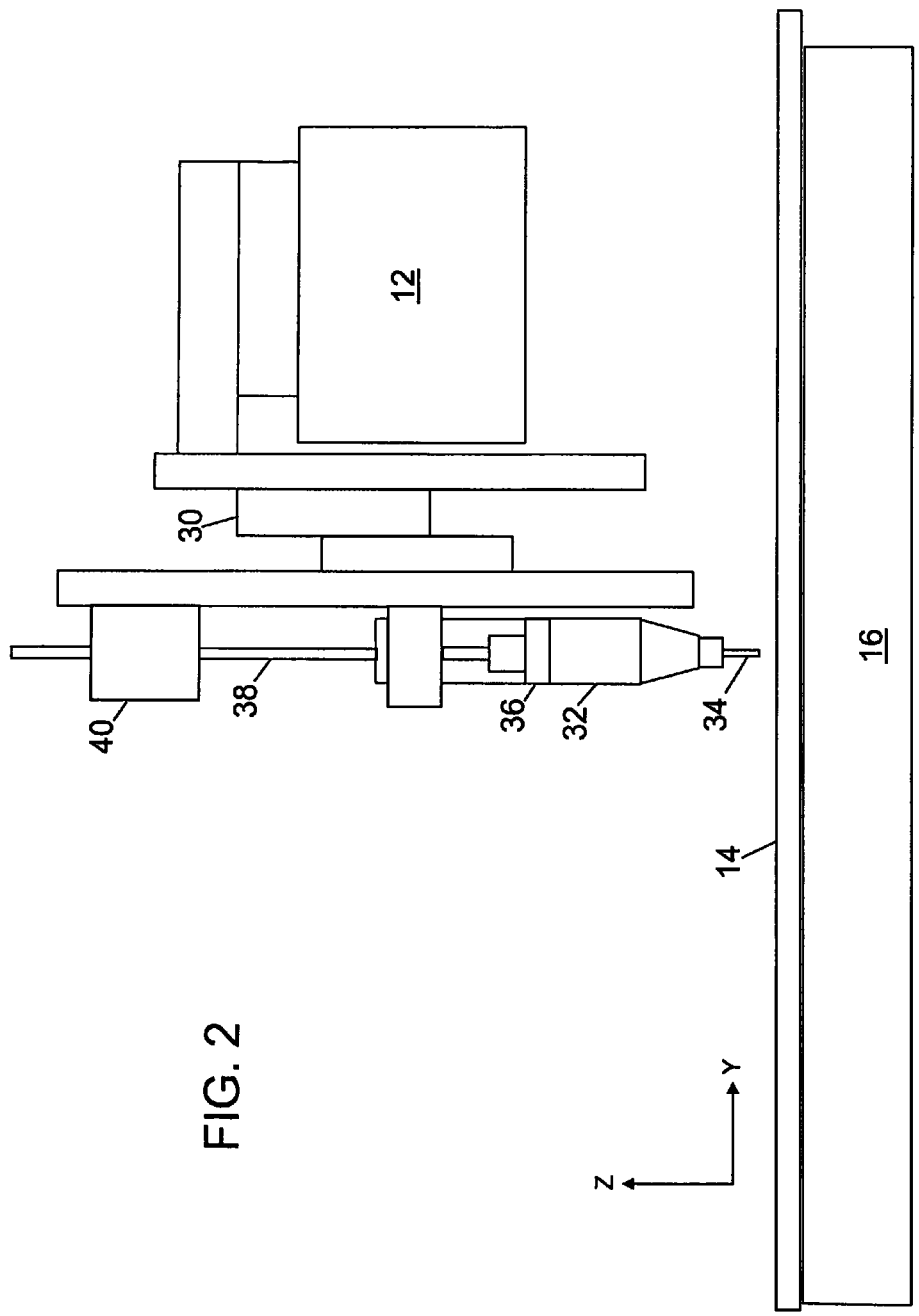
FIG. 2 is a simplified side elevational view of an exemplary embodiment of a system of pointillist painting.

FIGS. 1 and 2 are simplified top and side views of an exemplary embodiment of a system 10 of pointillist painting. System 10 employs an automated 3-D positioning system such as a gantry structure 12 that spans over a painting surface 14 such as a mounted canvas firmly supported and affixed by brackets 16. Gantry structure 12 is operable to precisely position a colorant dispensing mechanism 18 over specific locations (X,Y) of painting surface 14 using a number of actuators and motors. Gantry structure 12 includes an X-axis actuator 20 and motor 24, and Y-axis actuator 26 and motor 28. Gantry structure 12 is further operable to achieve displacement of the colorant dispensing mechanism 18 along the Z-axis (the distance from painting surface 14) using a Z-axis actuator 30. Accordingly, system 10 is operable to achieve precise positioning of colorant dispensing mechanism 18 over painting surface 14 in the X, Y, and Z axes. In one embodiment, the colorant dispensing mechanism is motionless while the colorant is being deposited, in another embodiment, the colorant dispensing mechanism is in motion while the colorant is being deposited. Colorant dispensing mechanism 18 is controllably operable to deposit three-dimensional dots or drops of colorant to accomplish the desired textured effect. Details of colorant dispensing mechanism 18 are described below. Although painting surface 14 is shown in the drawings as having a generally horizontal orientation, it should be noted that other orientations may be chosen.

It should be noted that although a gantry system is described and shown herein, the automated 3-D positioning system may be implemented in other suitable ways. For example, a robotic atm having multiple degrees of freedom may be used to properly position the colorant dispensing mechanism 18.

An embodiment of colorant dispensing mechanism 18 is shown in FIG. 2. Colorant dispensing mechanism 18 is releasably clamped to gantry structure 12 and, similar in structure to a syringe, includes a colorant chamber 32 used to contain a desired colorant of desired color and consistency. Colorant chamber 32 is in fluid communication with a colorant dispensing tip 34 from which the colorant drop is exuded and applied to painting surface 14. A piston 36 driven by a push rod 38 may be used to discharge the colorant onto the canvas, where push rod 38 is displaced by an actuator 40 implemented by a motor, for example.

Although not explicitly disclosed herein, an embodiment of colorant dispensing mechanism 18 may employ a dispensing tip in fluid communication with a remote colorant reservoir. In this embodiment, the colorant reservoir may be of a sufficient volume to store all the colorant needed of each color for the painting so that no mid-point re-loading of full syringes is necessary.

Because of the preferred viscosity of the colorant, the exuded drop of colorant or paint will have a two-dimensional circular coverage having a three-dimensional profile. The deposited colorant may have a profile similar to a chocolate morsel marketed and sold under the brand HERSHEY'S KISSES®, or the dome atop the Taj Mahal, to name just two examples. The colorant dots with the desired 3-D profile provides a texture dimension to the resultant painting, which is strikingly distinct from paintings that are composed of two-dimensional or flat dots.

The actuators and motors that achieve the precise positioning of colorant dispensing mechanism 18 in the X, Y, Z axes as well as the actuation of push rod 38 are under the control of a computer system 42, which may be implemented by a generalized computer or specialized motion control computer. Under the control of computer 42, the actuators and motors of gantry structure 12 are instructed to position colorant dispensing tip 34 of colorant dispensing mechanism 18 at a specific location (X,Y,Z), and once positioned over the desired point and height, push rod 38 actuation is effected to exude a measured amount of colorant from dispensing tip 34. After the application of colorant to a specific location, the Z-axis actuator 30 is activated to elevate application tip 34, if necessary, prior to moving the colorant dispensing mechanism to avoid interfering with colorant already on the canvas.

Although canvas may be a common painting surface, other suitable painting surfaces or materials may be used. For example, particle board, glass, plastic, and metal materials having planar or non-planar surfaces may be incorporated herein. Further, the colorant is a general term used herein to indicate a liquid impregnated with color pigments, which may include oil, acrylic, polymer, and other types of suitable paints. It is preferable that the paint used has the proper viscosity and other characteristics to retain a three-dimensional shape after deposition on the painting surface to achieve desired textures. It is further preferable that the deposited paint can be manipulated by air blasts or other means (e.g., brush, knife, stamp, etc.) to alter its three-dimensional profile as well as its two-dimensional shape or coverage.

Figure 3:
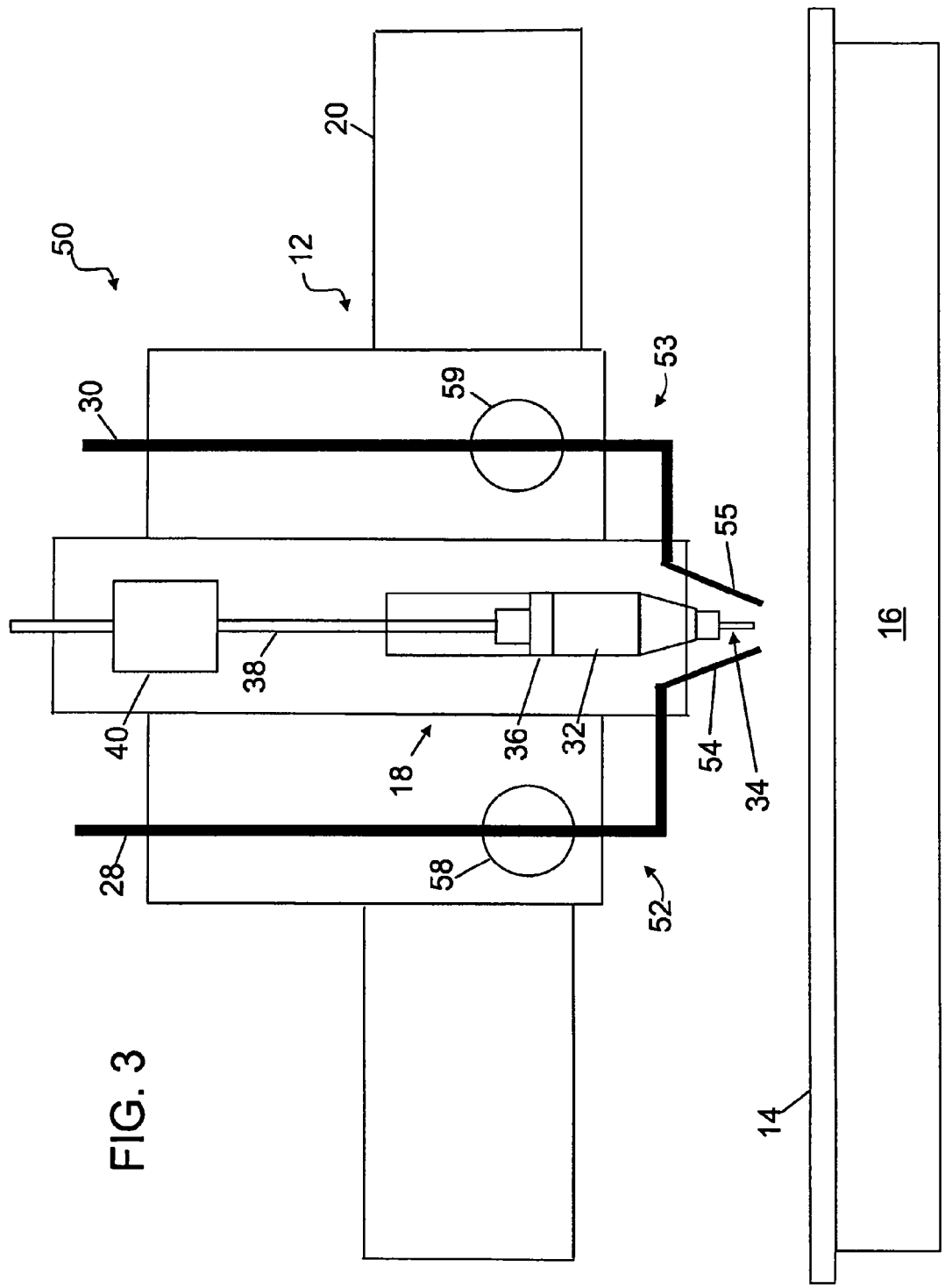
FIG. 3 is a simplified side elevational view of an alternate exemplary embodiment of a system of pointillist painting.

FIG. 3 is a simplified side elevational view of an alternate exemplary embodiment of a system of pointillist painting 50, where like reference numerals are used to refer to like structures and devices shown in FIGS. 1 and 2. System 50 is shown to include two colorant manipulation devices 52 and 53. Colorant manipulation devices 52 and 53 include air nozzles 54 and 55 positioned proximately to colorant dispensing tip 34. Respective air hoses 28 and 30 couple air nozzles 54 and 55 to a pressurized air source (not shown) and where the pressurized air flow is controlled by air valves 58 and 59. In this alternate embodiment of the system, one or more colorant manipulation devices 52 and 53 may be used to alter or manipulate the shape and/or coverage of a colorant dot immediately after depositing the colorant on the painting surface. In this example, a quick measured blast or puff of air aimed in a predefined direction may be used to achieve a particular colorant dot profile and coverage. The colorant dots of the entire painting surface may received the same uniform manipulation treatment, or alternately, selected portions of the painting surface may receive different manipulation treatment by varying the direction, amount, duration, sequence, and aperture size variables, for example, while applying the measured blast of air. Therefore, the artist is able to customize many of the colorant deposition or application design parameters to achieve the desired effect and overall look of the painting.

Figure 4:
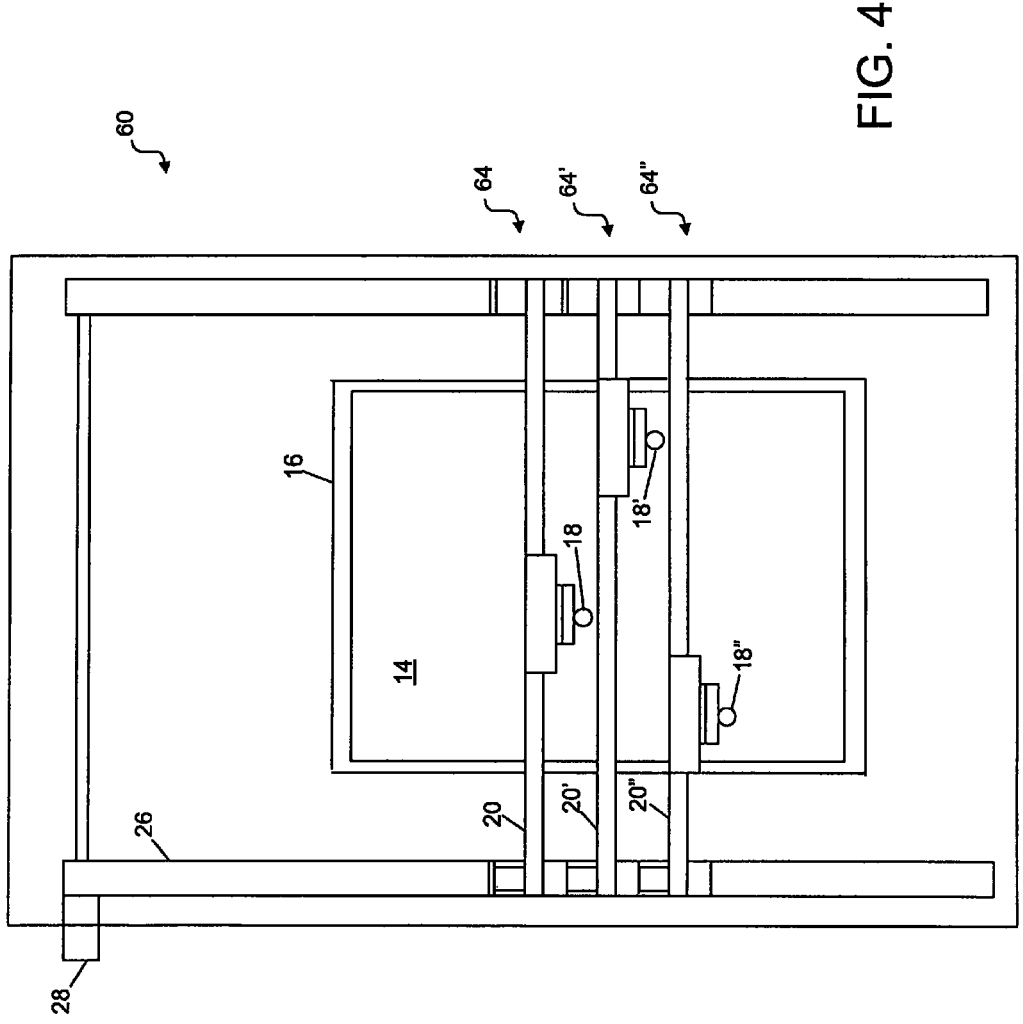
FIG. 4 is a simplified top view of an alternate exemplary embodiment of a system of pointillist painting.

FIG. 4 is a simplified top view of yet another alternate exemplary embodiment of a system of pointillist painting 60, where like reference numerals are used to refer to like structures and devices found in FIGS. 1 and 2. System 60 includes multiple gantry structures 64, 64', and 64" to achieve placement of multiple colorant dispensing mechanisms 18, 18', and 18". In this exemplary embodiment, there are three X-axis actuators 20, 20', and 20" that may operate independently in the X-axis, but their displacement in the Y-axis are in unison. Alternatively, the multiple colorant dispensing mechanisms may each have its own X and Y actuation and can move independently in both axes. As shown in FIG. 4, system 60 includes three gantry structures 64, 64', and 64" for the precise placement of three colorant dispensing mechanisms 18, 18', and 18", but other embodiments may be implemented as desired. The multiple colorant dispensing mechanisms may be operated in parallel for higher productivity, especially for larger painting surfaces.

From the foregoing, each colorant dot to be placed on a painting surface may be specified with the following design parameters: color, (X,Y) position, tip height, amount of paint to be dispensed, optional motion of the dispensing tip during deposition (starting point, end point, and travel time), height to raise the dispensing tip after deposition, and manipulation design parameters including air pressure, aperture size, angle, and duration. The design parameters may be grouped to define a "style" that the artist may store and later recall to implement on multiple paintings.

Figure 5:
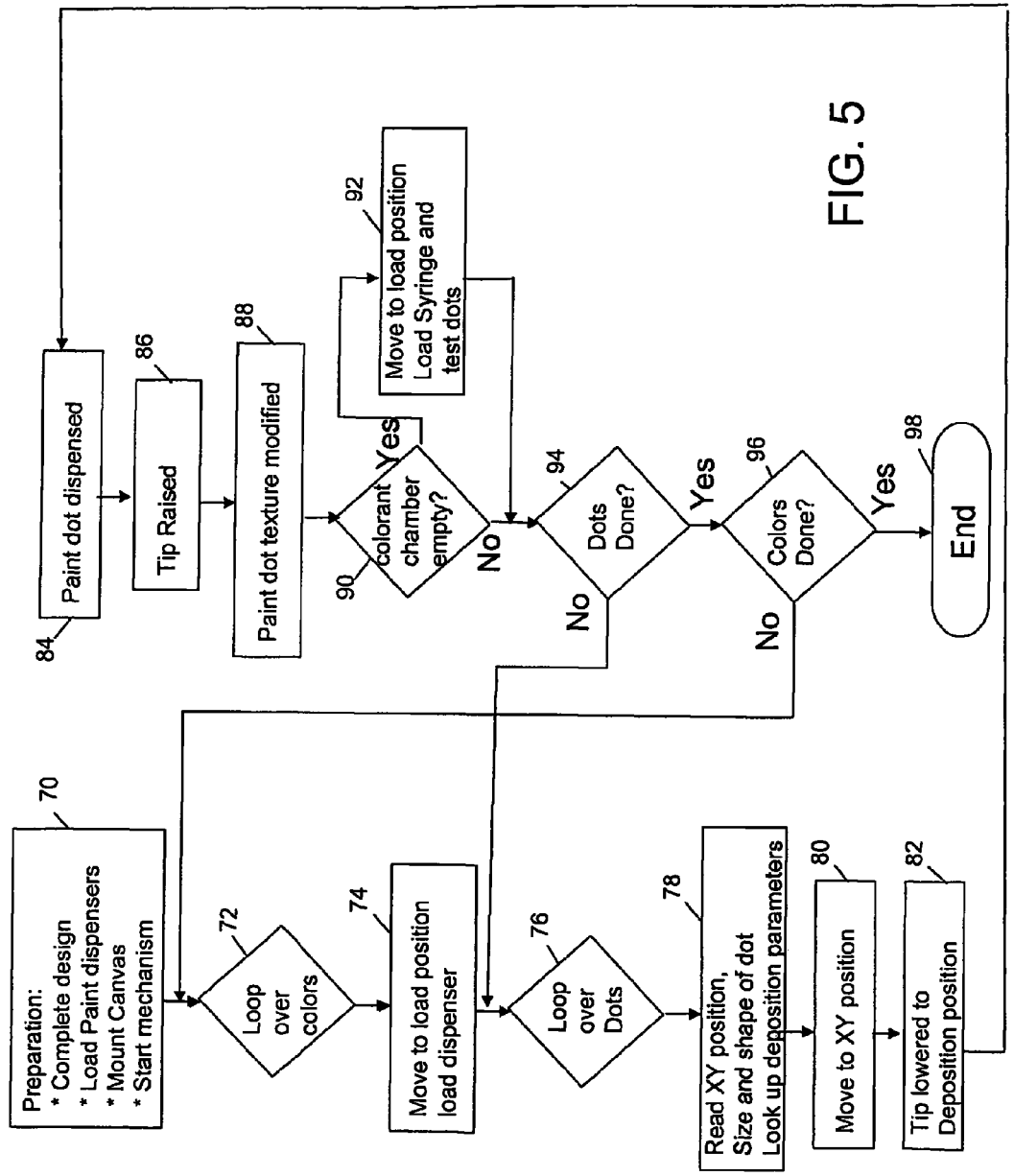
FIG. 5 is simplified flowchart of an exemplary method to operate a system of pointillist painting.

FIG. 5 is simplified flowchart of an exemplary method to operate a system of pointillist painting. In a preliminary step 70, preparations are made to operate the system, including complete the painting design that specifies the positioning of dots and other additional design parameters used to achieve the desired coverage and profile (texture) of the colorant dots. The design specification is contained in a file readable and executable by computer 42. The preparation further includes loading the colorant into the dispensing mechanism, such as filling syringes with different colors of paint that will be used for the painting, and mounting and securing the canvas in the bracket. In block 72, the process loops over each color that will be used in the painting. In block 74, the dispensing mechanism is loaded with one or more filled syringes, and test dots, if desired, are done at this time. In block 76, the process loops over each dot.

In block 78 for each dot, the (X,Y) position and other design parameters are read from the design specification file. In some instances the proper deposition parameters are derived by look-up or another manner. In block 80, the actuators and motors are used to move the colorant dispensing tip to the proper (X,Y) location. In block 82, the colorant dispensing tip is lowered to the specified deposition height above the painting surface. In block 84, the colorant dot is dispensed by actuating the push rod and piston of the dispensing mechanism. If motion during deposition is called for, the actuators and motors are effected to move the dispensing tip accordingly. In block 86, the measured amount of colorant is applied to the painting surface and the dispensing tip is raised. In block 88, any manipulation to modify the dot shape and profile is done, such as applying a puff of air at a specified angle and duration. In block 90, the colorant chamber of the dispenser is checked to determine whether it is empty. If it is, the mechanism is moved to a loading position so that a filled dispenser can be loaded in block 92. In block 94, if there are dots of the same color left to be deposited, the process returns to block 76 for the next dot. In block 96, if there are other paint colors to be applied, the process returns to block 72 for the next color. This process is repeated until all colors and all dots of the painting design have been deposited and the desired texture accomplished. The process ends in block 98.

Changing gears, the description below is directed to the method of generating a pointillist painting design. The starting point of this method is a digital image, preferably a digital color image. Because a typical digital color image may include hundreds or thousands of colors, the image is preprocessed to reduce the number of colors to a manageable number. Existing software tools such as ADOBE® PHOTOSHOP® can be used to reassign the pixels in the digital image using only as many colors as the artist specifies. The resultant digital image is a collection of pixels, i.e., a pixel array, that is restricted to a manageable set of colors.

Figure 6:
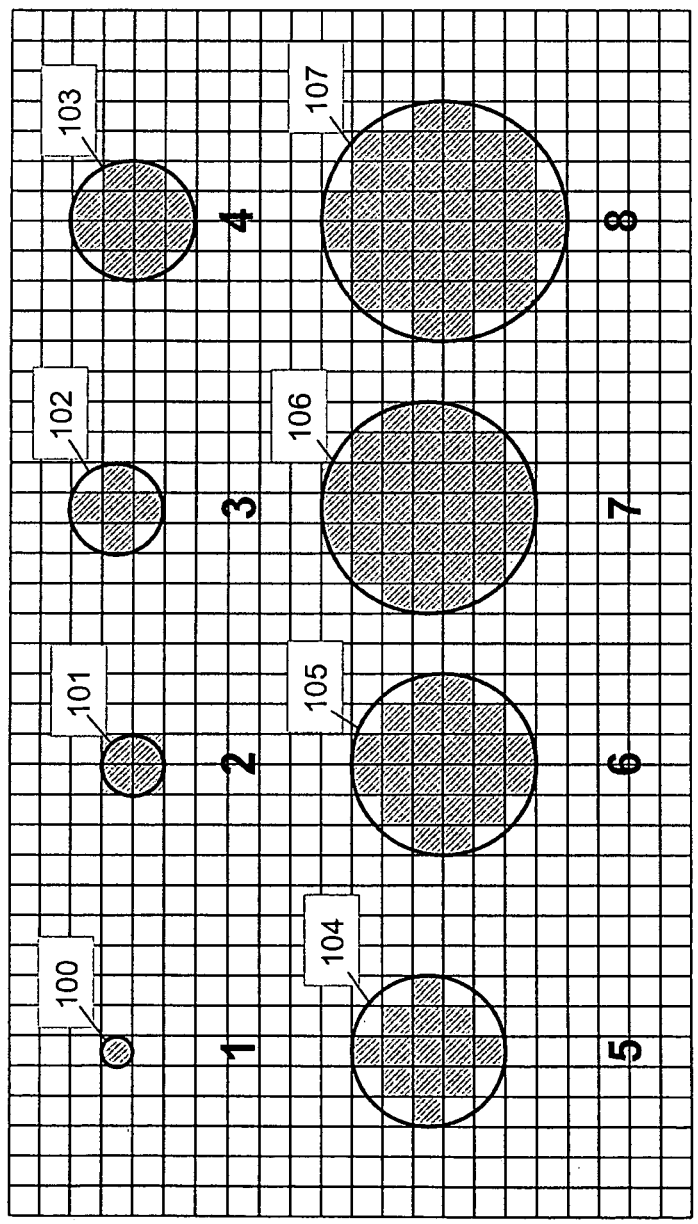
FIG. 6 shows illustrative examples of paint dot sizes from one pixel to eight pixels.

FIG. 6 shows illustrative examples of paint dot sizes from one pixel to eight pixels in diameter in the digital image. One embodiment of the method disclosed herein uses a pattern of pixels to represent a dot of a given size and shape or vice versa. The smallest dot of colorant 100 would be used to represent a single pixel. Dots 101-107 of larger sizes are also shown in FIG. 6 to represent two to eight pixels in diameter in the digital image. This method allows for approximately circular colorant dots to represent square pixels in the digital image.

Figure 7:
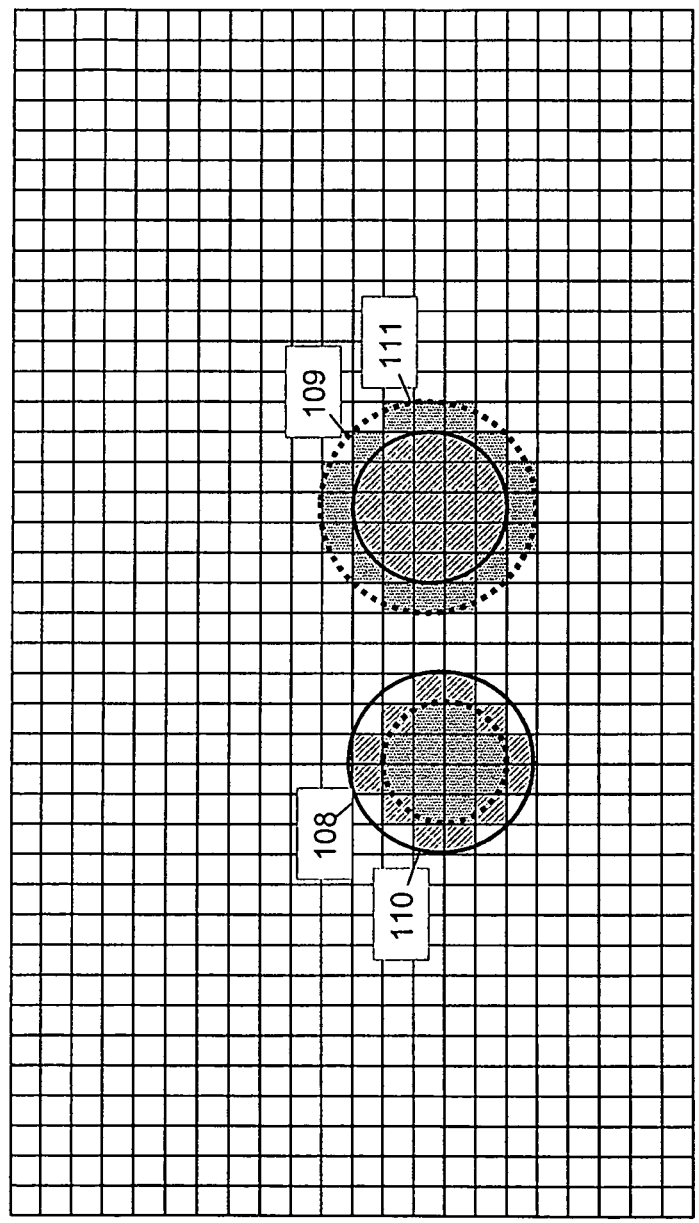
FIG. 7 shows illustrative examples of two paint dot sizes with respective exclusion zones.

This method also introduces the concept of exclusion zones. FIG. 7 shows illustrative examples of two paint dots 108 and 109 with respective exclusion zones 110 and 111 (shown with dashed lines). Exclusion zones 110 and 111 are situated in the center of each dot, represented by a pattern of pixels concentric with the dot. The exclusion zone of a colorant dot represents an area that cannot be shared with the exclusion zone of any other colorant dot, of any color. In other words, the exclusion zones of adjacent dots cannot overlap. FIG. 7 shows an example of a six-pixel diameter dot 108 with a four-pixel diameter exclusion zone 110, and a five-pixel diameter dot 109 with a seven-pixel diameter exclusion zone 111.

Figure 8:
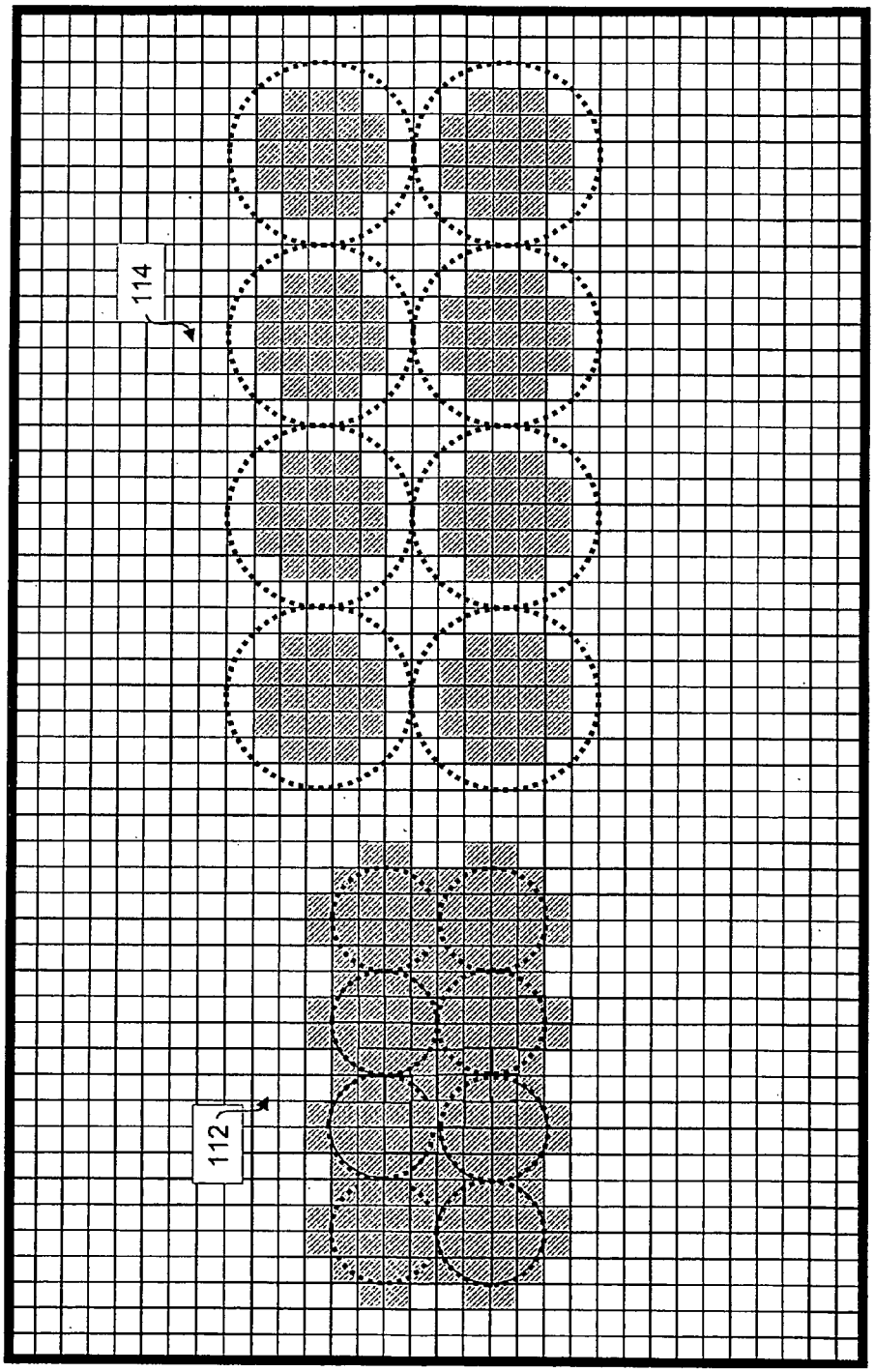
FIG. 8 shows illustrative examples of an exclusion zone and it affect on paint dot placement.

FIG. 8 shows illustrative examples of an exclusion zone and its effect on paint dot placement. On the left is a cluster of eight five-pixel diameter dots 112 with four pixel wide exclusion zones (shown with dashed lines), and on the right is a second cluster of eight five-pixel diameter dots 114 with seven pixel wide exclusion zones. Because of the definition of the exclusion zones in terms of placement and size, the colorant dots overlap in cluster 112, but the colorant dots do not overlap but is spaced apart in cluster 114.

Figure 9:
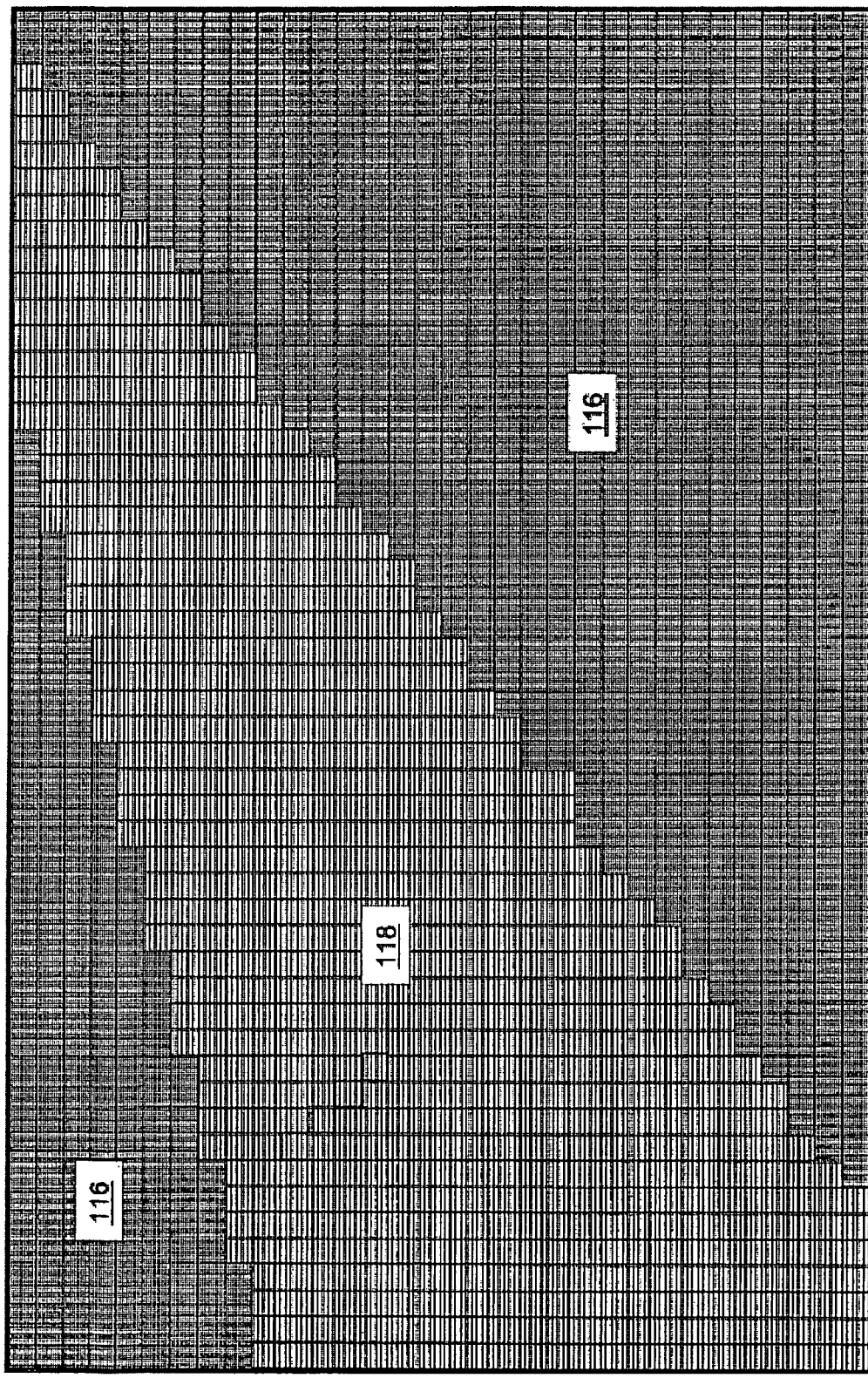
FIG. 9 is an illustrative example of a portion of an exemplary digital color image having two colors.

FIG. 9 is an illustrative example of a portion of an exemplary digital color image having two colors 116 and 118. As shown, an exemplary grid of a single-pixel pattern is defined over the entire digital image. Grids of other sized pixels and in other orientations may be used. Over this grid, the disclosed method defines the placement of colorant dots, the sizes of the dots, and the sizes of the exclusion zones that would represent the digital color image.

Figure 10:
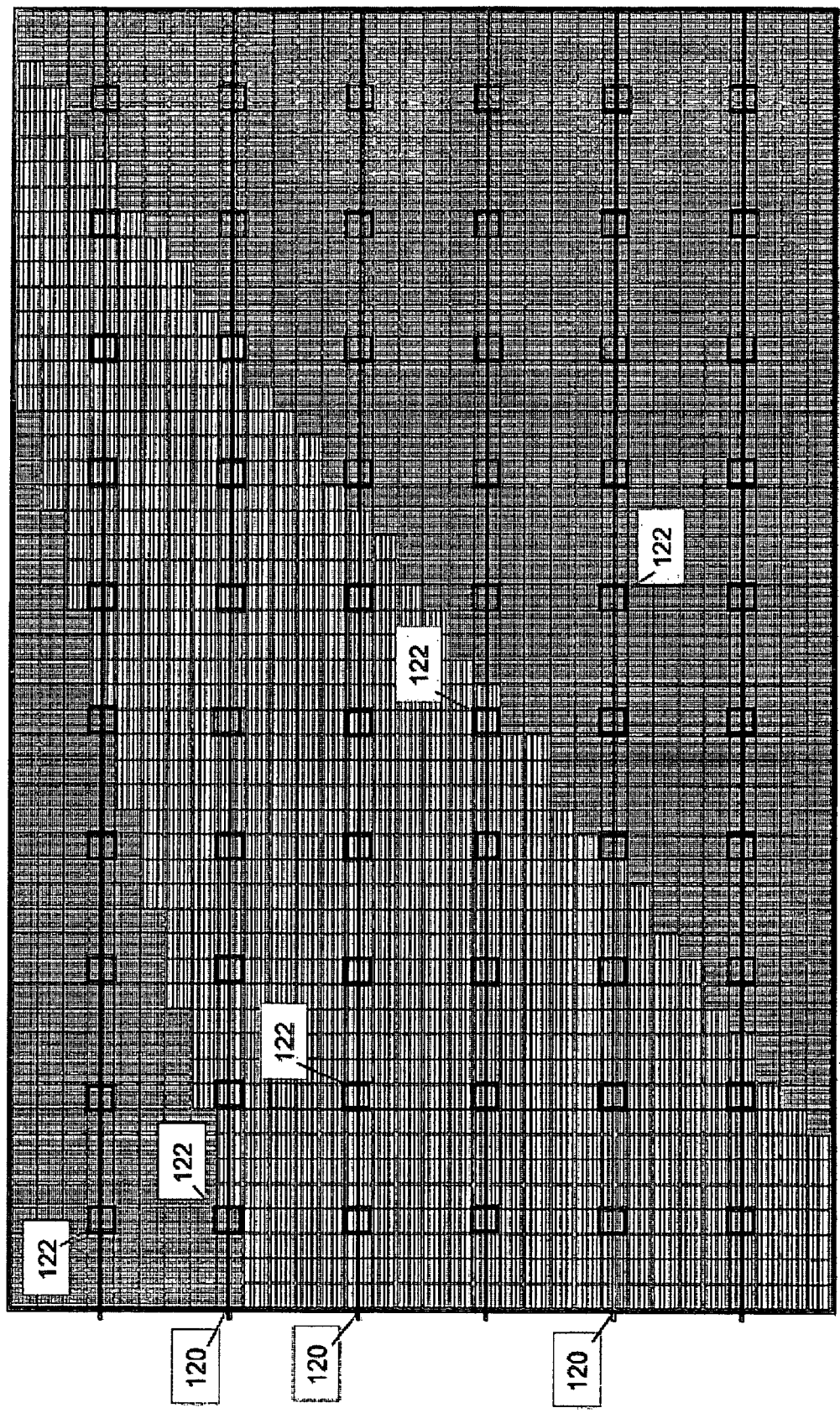
FIG. 10 is an illustrative example of a first paint dot distribution scheme overlaid on the exemplary digital color image with two colors.

FIG. 10 is an illustrative example of a first paint dot distribution scheme overlaid on the exemplary digital color image with two colors 116 and 118. An array of straight single-pixel lines 120 are defined over the entire digital image. The single pixels 122 of each pixel line are spaced apart by a specified number of pixels and the lines are spaced apart by a specified number of pixels. The example in FIG. 10 show pixel lines 120 that are five pixels apart and pixels 122 located along these lines are five pixels apart. These spacings can be defined by the artist according to his/her personal preferences. The artist may choose the spacing of the pixels and the pixel lines for the dot distribution scheme as it would be a significant factor contributing to the appearance of the painting. The defined placement of the pixels 112 on the pixel lines 120 represent the possible locations of paint dots, or the colorant dot distribution scheme.

Figure 11:
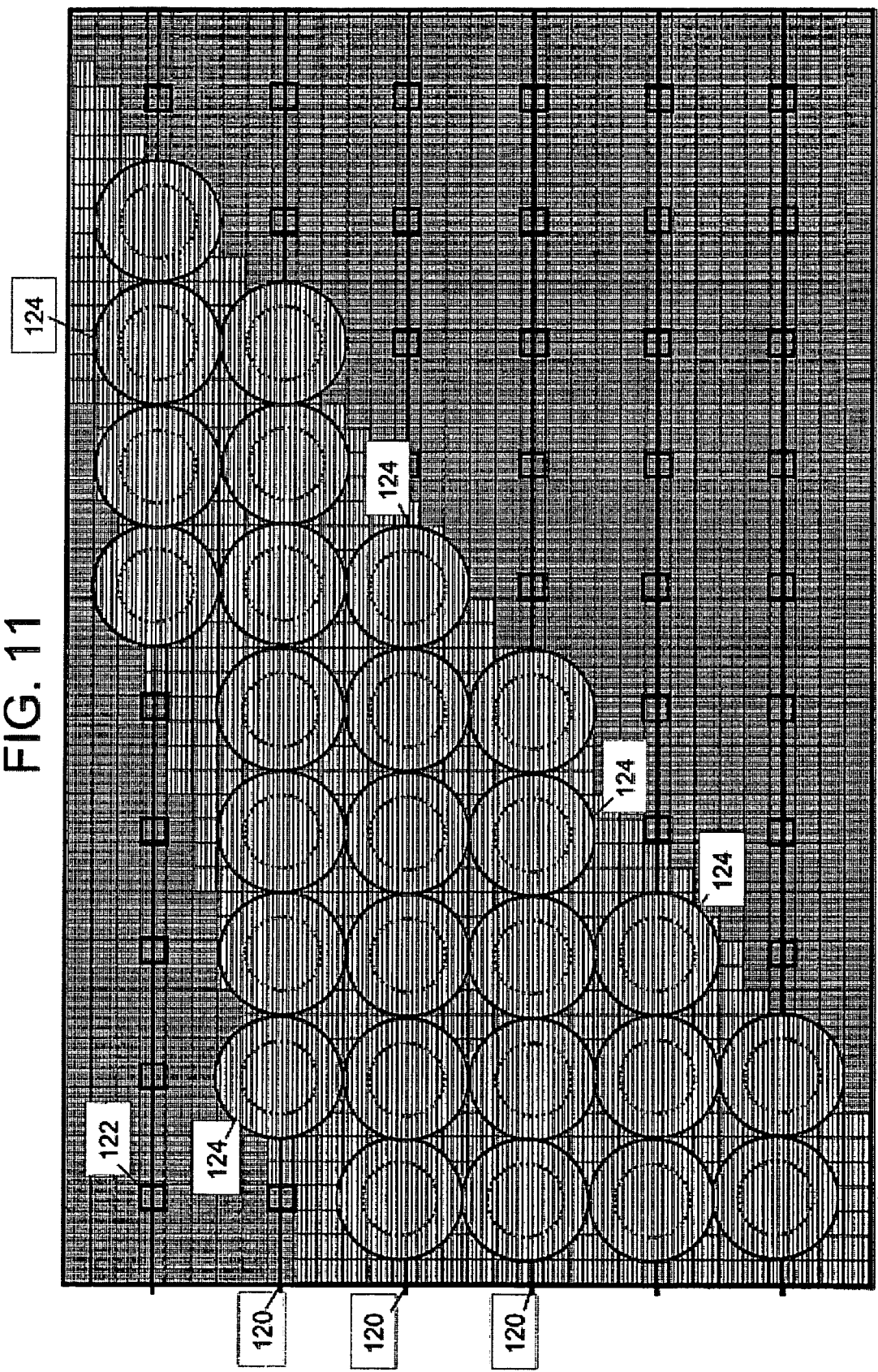
FIG. 11 is an illustrative example of paint dots of a first color placed according to the first paint dot distribution scheme.

FIG. 11 is an illustrative example of paint dots 124 of a first color 118 placed according to the first distribution scheme shown in FIG. 10. The placement of the colorant dots 124 in the design is done iteratively by the method, one after another along the pixel lines, and then completing one pixel line after another pixel line. This process is repeated until all possible locations have been examined and dots placed in the design specification when appropriate. In order to place a colorant dot in the design, the selected pixel on the line for a particular color would have to be a pixel of the same color (alternatively all of the pixels of the exclusion zone of the dot would have to be the color of the dot being placed), and all of the pixels of the exclusion zone of that dot would have to be not claimed by the exclusion zone of any other dot. FIG. 11 shows the placement of five-pixel diameter dots of a first color 118 with three-pixel diameter exclusion zones in the design prior to the placement of colorant dots of a second color 116. The artist may choose the order in which the colors are addressed in the design as it may be another significant factor contributing to the appearance of the painting.

Figure 12:
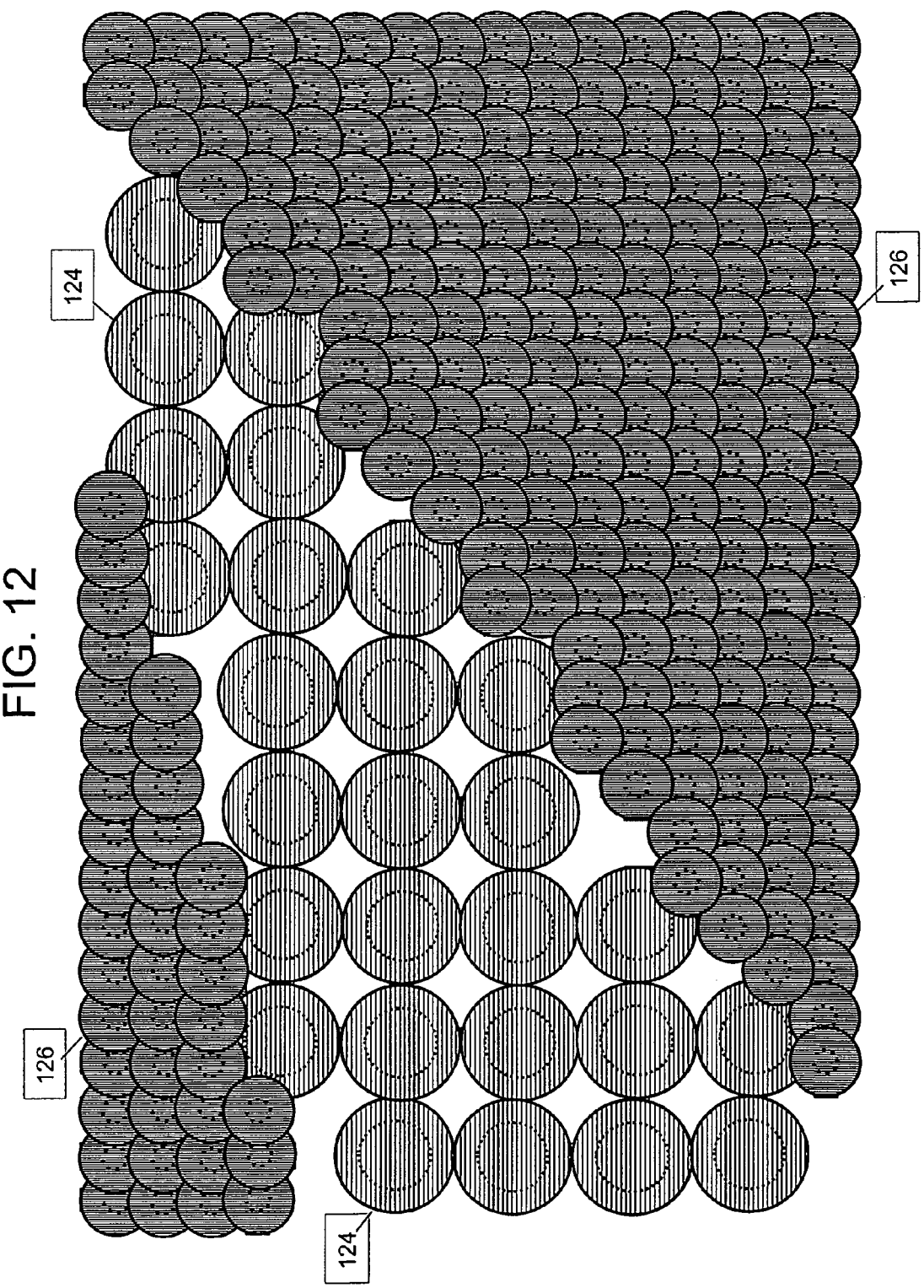
FIG. 12 is an illustrative example of paint dots of a second color placed according to a second paint dot distribution scheme after the placement of the first color paint dots.

FIG. 12 is an illustrative example of paint dots 126 of a second color 116 placed according to a second paint dot distribution scheme after the placement of the first color paint dots 124. Although the colorant dots of the second color may be placed using the same distribution scheme as the first color dots, FIG. 12 shows colorant dots 126 of second color 116 placed using a distribution scheme using vertical pixel lines spaced two pixels apart with potential dots spaced two-pixels apart along each line. These colorant dots 126 each have a one-pixel exclusion zone. As shown, colorant dots 126 of the second color sometimes overlap or partially cover each other and colorant dots 124 of the first color, one dot may overlap a neighboring dot's exclusion zone, however in this scheme exclusion zones may not overlap. Other rules for dot distribution and placement are possible as well.

Figure 13:
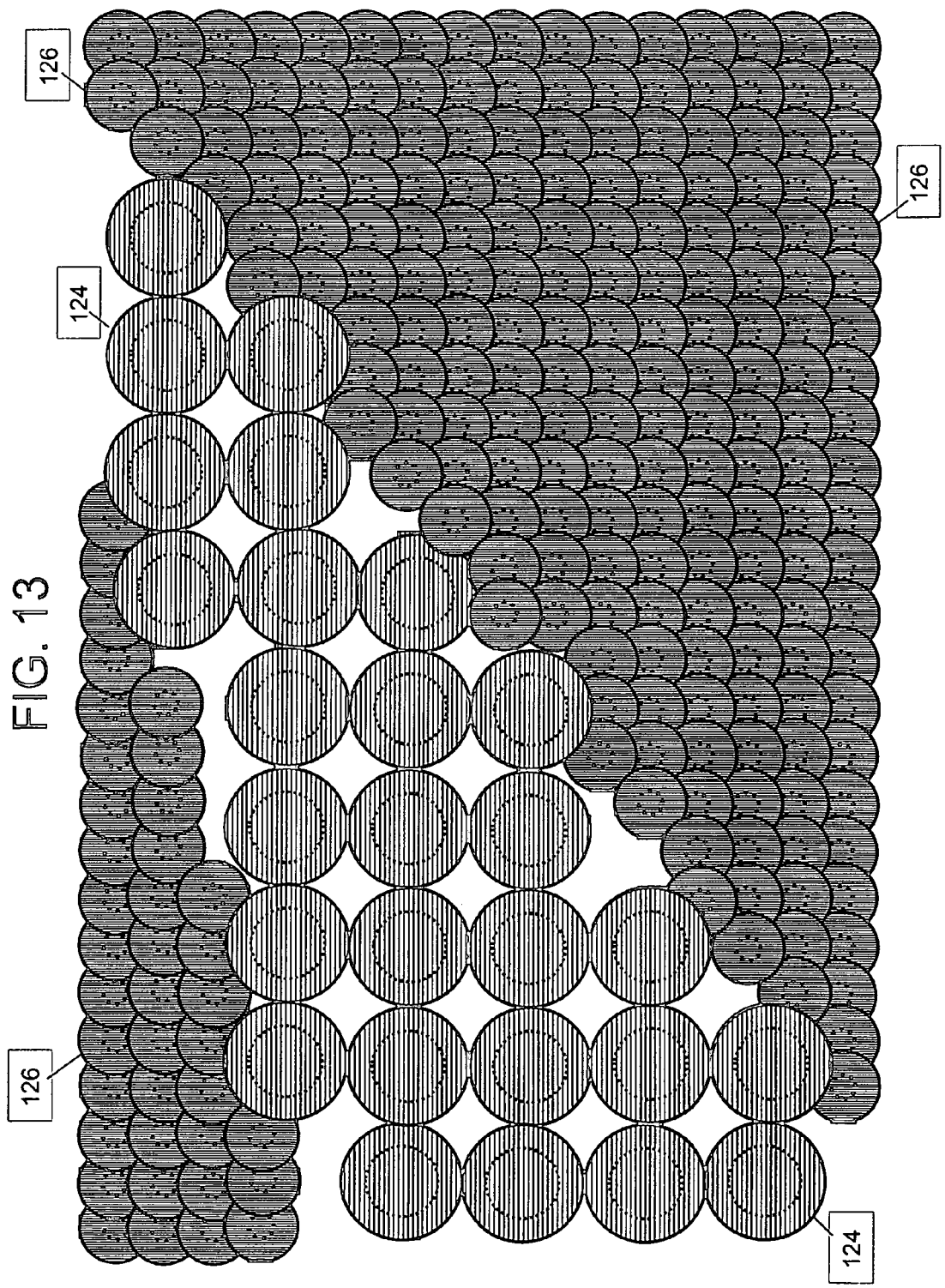
FIG. 13 is an illustrative example of a reversal of paint dot color order shown in FIG. 12 on a white background.

FIG. 13 is an illustrative example of a reversal of paint dot color order shown in FIG. 12. In this example, the artist has chosen to address or assign colorant dots 124 of color 116 before colorant dots 126 of color 118 but using the same distribution schemes as in FIG. 12. It may be seen that changing the order in which the colors are addressed may produce a different resultant painting.

Figure 14:
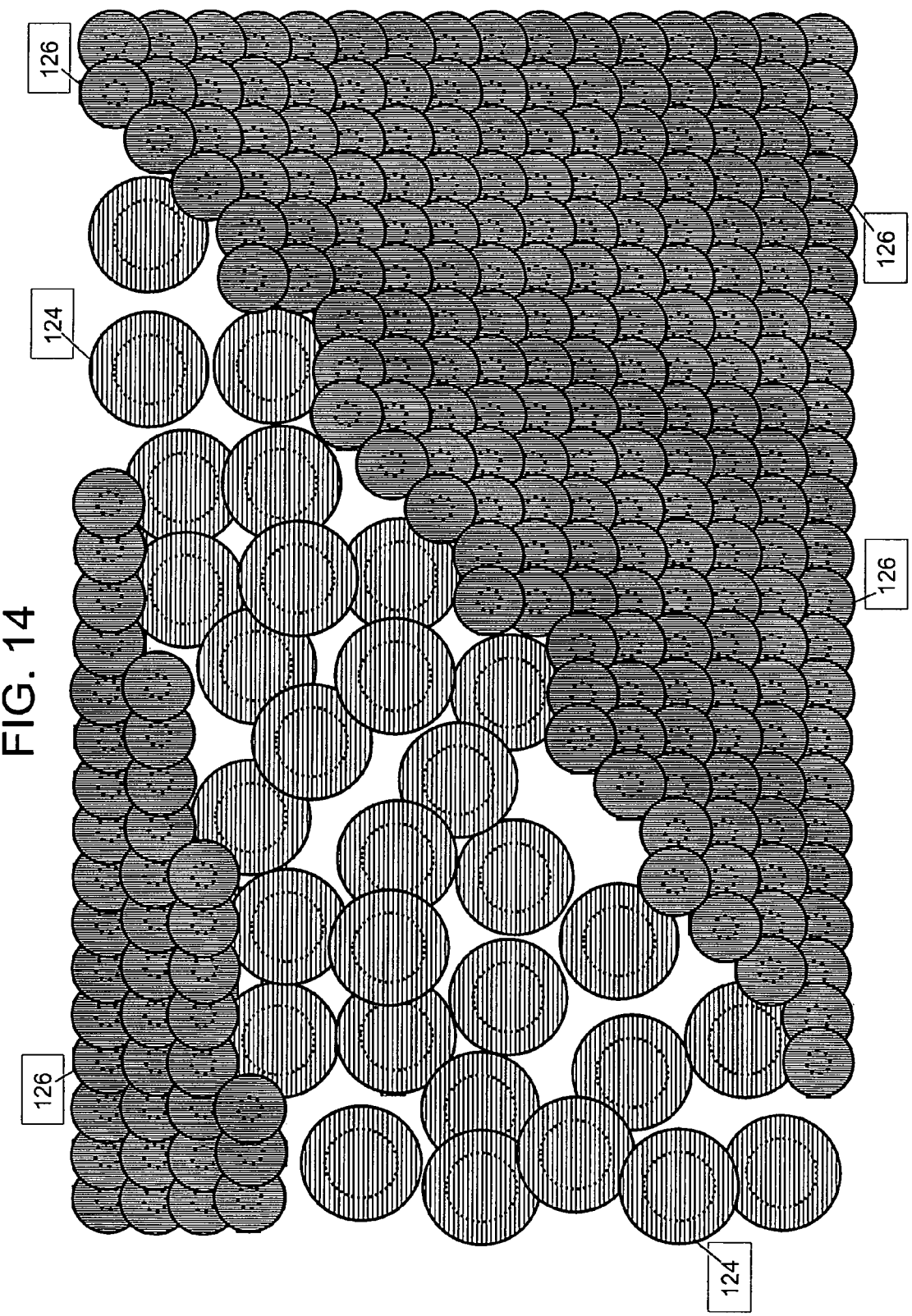
FIG. 14 is an illustrative example of paint dot placement with the paint dots of the first color placed pursuant to a random distribution scheme.

FIG. 14 is an illustrative example of paint dot placement with the placement of paint dots 124 of the first color assigned pursuant to a random distribution scheme. Again, the distribution scheme parameters are definable by the artist according to his/her preferences to achieve the desired result. The method further provides an artist the ability to define a style that defines a set of distribution parameters that is stored and may be recalled later for another painting.

FIG. 15 is an illustrative example of paint dot placement as shown in FIG. 14 with the addition of one or more masks 128 in a selected region of colorant dots. The artist may define masks in the design to specify areas where no dots are placed. The definition of masks 128 may include the shape, dimensions, and position of the mask.

FIG. 16 is a simplified flowchart of an exemplary method of designing a pointillist painting. In block 130, a digital color image is an input to the computer executing the method. As described above, the digital color image may have gone through one or more steps of pre-processing which may include reducing the colors of the digital image to a manageable set. The digital image is a definition of an array of pixels, each of which has a color assignment. In block 132, all the pixels in the digital image are examined and the list of unique colors in the digital image are identified. Further, the number of pixels of each color is also determined. In block 134, the list of unique colors are ordered by one of several methods automatically or selectable by the artist. This color order defines the sequence in which pixel distribution scheme of each color is determined and the colorant dot placement in the design. The exemplary methods of ordering the colors may include ordering by the value of red, green, or blue component of color, ordering by brightness, ordering by ascending or descending number of pixels of each color, and ordering by the artist's preference. In block 136, each unique color in the digital color image is addressed in turn, including the determination of colorant dot size, dot shape, dot exclusion zone size, and dot distribution scheme(s). For each distribution scheme, the following design parameters are defined: the pixel line (horizontal, vertical, angled, straight, curved, random, etc.), pixel line spacing, start of first pixel line, and pixel spacing along the lines. The artist may choose to define multiple distribution schemes for the same color in specific regions of the painting to achieve dots of varying sizes and spacing to achieve greater varieties of textures. Each distribution scheme requires a "pass" of colorant dot placement. Further, optional mask are also defined at this point.

In block 138, the colorant dot placement array is defined according to the design parameters set forth in block 136. In block 140, the process loops over each color in the digital image in the specified sequence to determine the dot placement arrays for all the colors in the digital image. In block 142, the resultant placement of each colorant dot is examined to ensure that the correct color dot is placed on the correct pixel positions, and that there are no overlaps in the exclusion zones of the colorant dots. The dots that meet these criteria are collected in a dot coordinate file or list with its attendant design parameters and this process is repeated until all dots of all colors have been processed, as verified in block 144.

After all of the colors in the list have been processed, the artist has the option to selectively drop one or more colors from the dot list in block 145. For example, the artist may use a black canvas, and selectively drop black color dots from the dot list. As a result, those areas that should have been covered by black paint dots are left open to reveal the black background of the canvas.

In block 146, a facsimile pointillist image of the resultant design incorporating the dots specified in the dot coordinate list is displayed on a monitor coupled to the computer as a preview, as shown in block 145. Optionally, known 3-D CAD tools may be used to model the resultant image where each dot has the proper 3-D profile to provide the artist a more realistic rendering of the surface texture. The 3-D modeling tool may apply some simple distortion of the paint dots to mimic the effect of colorant manipulation. Alternatively, plastic deformation and fluid dynamics modeling may be used to predict the 3-D profile of the dots. The 3-D tool may permit the preview image to be seen from different perspectives, under different types of lighting, and under different lighting angles.

As indicated by a dashed line in FIG. 16, Blocks 145 and 146 may be performed as an iterative loop to permit the artist to experiment dropping different color from the dot list to see the how that affects the resultant image.

The artist may not like the resultant pointillist image because it did not achieve the desired effect, at which point the artist may return to block 134 to change one or more of the design parameters, such as color sequence, dot size, shape, exclusion zone size, distribution scheme, number of passes, and masks. etc. On the other hand, if the artist likes the way the facsimile looked, then in block 150, the dot coordinate list is further processed to determine an efficient way to lay down the dots. For example, a known "travelling salesman" algorithm may be used to reduce the total distance traveled when moving from dot-to-dot in the list. The result may be a computer-readable file that is provided as an input to the computer 42 coupled to system 10, 50, 60 described above.

The features of the invention which are believed to be novel are set forth below with particularity in the appended claims. However, modifications, variations, and changes to the exemplary embodiments described above will be apparent to those skilled in the art, and the system and method of pointillist painting described herein thus encompasses such modifications, variations, and changes and are not limited to the specific embodiments described herein.

What is claimed is:

1. A method of generating a pointillist painting design, comprising:
   receiving a digital image file including a specification of a plurality of pixels representative of a digital image, the pixels each including a color definition;
   creating an ordered list of color definitions of the plurality of pixels in the digital image file;
   for each color definition in the ordered list determining a set of design parameters including:
      a dot size;
      a dot shape;
      a dot exclusion zone size; and
      a dot distribution scheme;
   for each color definition, determining a placement of a plurality of dots according to the pixels and color definitions in the digital image file and the set of design parameters;
   generating a dot list specifying the placement and design parameters of the plurality of dots representative of the digital image; and
   rendering on a display a facsimile image in response to the dot list.

2. The method of claim 1, wherein the set of design parameters further includes a three-dimensional dot shape.

3. The method of claim 1, wherein the set of design parameters further includes a mask definition.

4. The method of claim 1, wherein the set of design parameters further includes a number representative of the number of dot deposition passes.

5. The method of claim 1, wherein the dot distribution scheme specifies at least one of horizontal lines, vertical lines, angled lines, straight lines, curved lines, and random placement.

6. The method of claim 1, wherein the set of design parameters further includes two-dimensional coverage and three-dimensional profile of the dots.

7. The method of claim 1, further comprising, for each color definition, ordering the plurality of dots in the dot list to achieve dot deposition efficiency.

8. The method of claim 1, further comprising depositing a measured amount of colorant at specified positions on a painting surface in accordance with the dot list.

9. The method of claim 1, further comprising modifying any of the design parameters and color definition ordering in response to the displayed facsimile image.

10. A computerized system adapted to generate a textured pointillist painting design and implement the design on a painting surface, comprising:
    a display;
    a computer operable to:
       receive a digital image file including a specification of a plurality of pixels representative of a digital image, the pixels including a color definition;
       for each color definition in the digital image file, determining a set of design parameters including:
          a dot size;
          a three-dimensional dot shape;
          a dot exclusion zone size; and
          a dot distribution scheme;
       for each color definition, determining a placement of a plurality of dots according to the pixels and color definitions in the digital image file and the set of design parameters;
       generating a dot list specifying the placement and design parameters of the plurality of dots representative of the digital image; and
       rendering on a display a facsimile image in response to the dot list; and
    a colorant dispenser operable to apply a specified amount of a colorant to the painting surface and creating a plurality of dots having a two-dimensional coverage and three-dimensional profile at the specified placement on the painting surface in accordance with the dot list.

11. The system of claim 10, wherein the set of design parameters further includes a mask definition.

12. The system of claim 10, wherein the set of design parameters further includes a number representative of the number of dot deposition passes.

13. The system of claim 10, wherein the dot distribution scheme specifies at least one of horizontal lines, vertical lines, angled lines, straight lines, curved lines, and random placement.

14. The system of claim 10, wherein the computer is further operable to, for each color definition, order the plurality of dots in the dot list to achieve dot deposition efficiency.

15. The system of claim 10, wherein the colorant dispenser is further operable to deposit a measured amount of colorant at specified positions on a painting surface in accordance with the dot list.

16. The system of claim 10, wherein the computer is further operable to permit a user to modify any of the design parameters in response to the displayed facsimile image.

17. A computerized method of generating a textured pointillist painting design, comprising:
    receiving a digital image file including a specification of a plurality of pixels representative of a digital image, the pixels each including position information and color definition;
    for each color definition in the ordered list determining a set of design parameters for a plurality of dots;
    for each color definition, determining a placement of the plurality of dots according to the position information and color definitions of the plurality of pixels in the digital image file and the set of design parameters;
    generating a dot list specifying the placement and design parameters of the plurality of dots representative of the digital image; and
    rendering on a display a three-dimensional facsimile image in response to the dot list.

18. The method of claim 17, wherein the set of design parameters for each color definition in the digital image file includes:
    at least one dot size;
    at least one three-dimensional dot shape;
    at least one dot exclusion zone size; and
    at least one dot distribution scheme.

19. The method of claim 18, wherein the at least one dot distribution scheme specifies at least one of horizontal lines, vertical lines, angled lines, straight lines, curved lines, and random placement.

20. The method of claim 18, wherein the at least one dot distribution scheme specifies a line spacing and a dot spacing.

21. The method of claim 18, further comprising adjusting any of the design parameters in response to the displayed facsimile image.

22. The method of claim 18, further comprising selectively dropping at least one color from the dot list.

* * * * *